United States Patent

Pryce et al.

[11] Patent Number: 5,834,702
[45] Date of Patent: Nov. 10, 1998

[54] CONNECTOR AND CABLE ASSEMBLY FOR RIBBON CABLE WITH 90 OUTLET

[75] Inventors: John Edward Pryce, Herts; Reginald John Simmons, South Harrow; Michael Joseph Gerard Whelan, Langford Biggleswade, all of Great Britain

[73] Assignee: The Whitaker Corporation, Wilmington, Del.

[21] Appl. No.: 807,921

[22] Filed: Feb. 28, 1997

[30] Foreign Application Priority Data

Mar. 11, 1996 [GB] United Kingdom .................. 9605149

[51] Int. Cl.⁶ .................................................. H01B 7/08
[52] U.S. Cl. .................. 174/117 FF; 174/72 TR
[58] Field of Search .................. 174/117 FF, 72 TR, 174/81, 86

[56] References Cited

U.S. PATENT DOCUMENTS

| | | | |
|---|---|---|---|
| 3,524,921 | 8/1970 | Wolf | 174/117 FF |
| 4,065,199 | 12/1977 | Andre et al. | 439/498 |
| 4,289,370 | 9/1981 | Storck | 439/422 |
| 4,319,075 | 3/1982 | Willette | 174/117 FF |
| 4,614,028 | 9/1986 | Rich | 29/749 |
| 4,812,135 | 3/1989 | Smith | 174/117 FF X |
| 5,408,050 | 4/1995 | Kashio et al. | 174/117 FF |

FOREIGN PATENT DOCUMENTS

| | | |
|---|---|---|
| 0 680 849 A1 | 11/1995 | European Pat. Off. . |
| 0 703 119 A1 | 3/1996 | European Pat. Off. . |

*Primary Examiner*—Bot L. Ledynh
*Assistant Examiner*—Chau N. Nguyen
*Attorney, Agent, or Firm*—Driscoll Nina

[57] ABSTRACT

An airbag connector and cable assembly comprises a connector having a cable receiving cavity and a cable outlet extending perpendicularly to the cavity. A flat cable terminated to the connector is folded along a fold in the cable outlet region of the connector. The cable is then looped over the fold to provide a flexible loop. The loop enables absorption of tolerance in the positioning of the cable at the outlet with respect to the fold, without causing undue force on the conductors that are bent through the fold. The latter insures a high reliability and is cost effective.

6 Claims, 3 Drawing Sheets

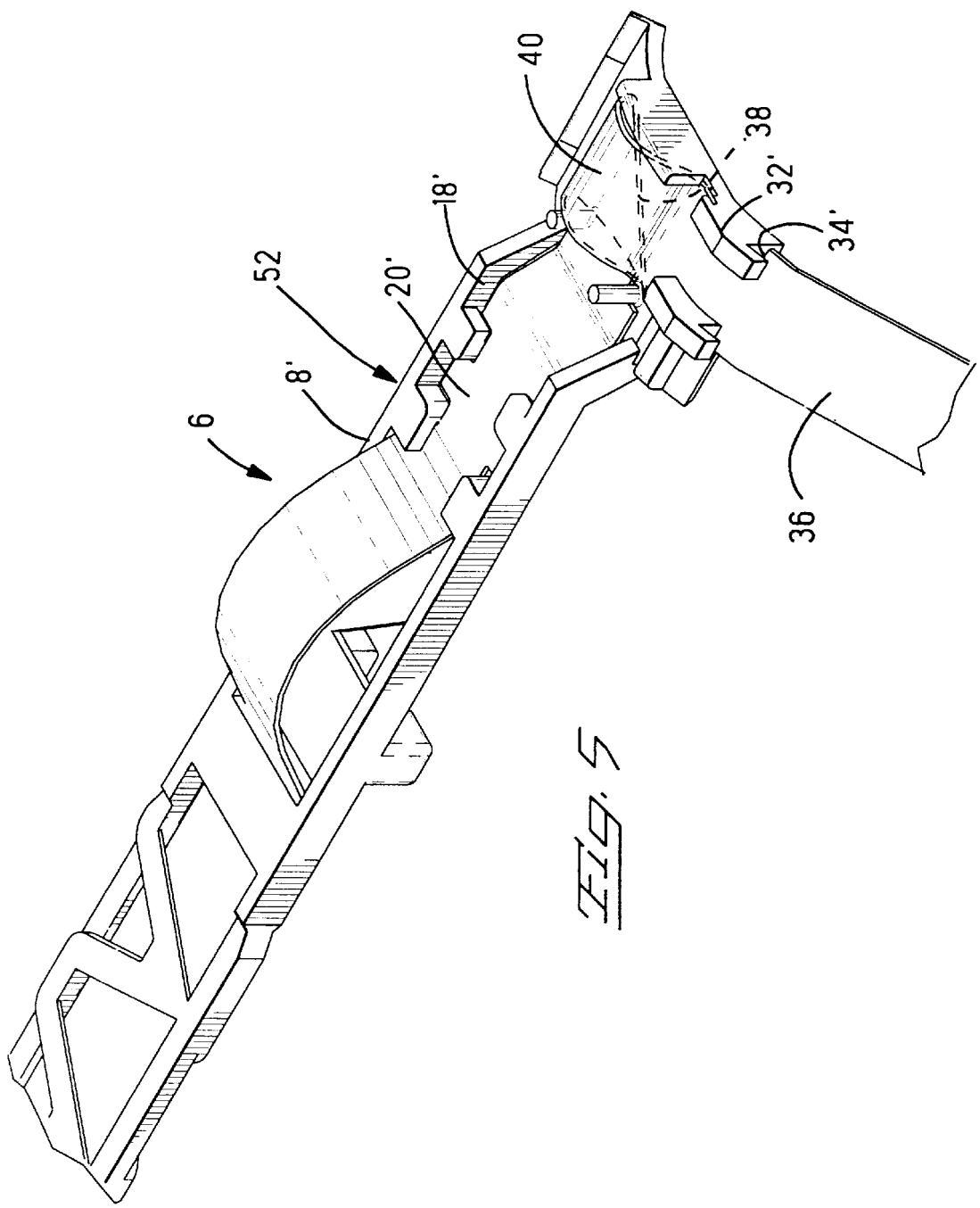

CONNECTOR AND CABLE ASSEMBLY FOR RIBBON CABLE WITH 90 OUTLET

BACKGROUND OF THE INVENTION

1. Field of the Invention

This invention relates to a connector and ribbon cable assembly, where the ribbon cable extends transversely out of the connector in relation to a portion of cable extending in the connector.

2. Description of the Prior Art

The use of ribbon, or flat flexible cable is advantageous in applications where space constraints require a very thin or flat cable. An example of such an application, is in automotive airbag connection systems that interconnect an airbag in an automotive steering wheel cassette to control the electronics in the automobile. Even without particularly high space constraints, use of ribbon or flat flexible cable is still advantageous due to the ease with which it can be terminated to contacts of a connector, for example by insulation piercing contacts terminated to the whole cable in a single operation.

In certain applications, it is necessary to change the direction of the cable due to space constraints. With ribbon or flexible flat cable a change of direction of the cable in a plane is effected by folding the cable over itself (e.g. to change the direction of the cable by 90°). This forms a crease or sharp bend in the flat cable. Although the flat cable is very flexible in a direction transverse to the plane of the cable, it is very inflexible in the plane of the cable thereby requiring such folding in order to change direction.

In certain safety applications, for example automotive airbag applications, it is necessary to insure that the creasing or folding of cable does not lead to damage of the conductors therein, in view of the need for very high reliability.

It is therefore desirable to have cable and connector assemblies for ribbon or flat flexible cable which are particularly reliable yet nevertheless conform easily to space constraints, such space constraints requiring a change in the direction of the cable. There is also a continuous requirement for a very high reliability, yet low cost.

SUMMARY OF THE INVENTION

It is an object of this invention to provide a cable assembly, using ribbon or flat flexible cable, that conforms to space constraints requiring a change in direction of the cable, that is very reliable, yet cost effective.

It is an object of this invention to provide an automotive airbag connector using flat flexible cable or ribbon cable with a cable outlet transverse to a portion of cable extending in the connector, in a reliable and cost effective manner.

It is an object of this invention to provide a cable and connector assembly using ribbon or flat flexible cable that is folded over for a change in direction of the cable, such fold having means to enable adjustment of positioning of the cable in a safe, reliable yet cost effective manner.

Objects of this invention have been achieved by providing a cable assembly according to the claims. In particular, by providing a connector or cable guide, and cable assembly comprising a ribbon or flat flexible cable comprising a plurality of conductors arranged in a juxtaposed manner in a plane of the cable, and a cable guide having a housing with a cable receiving cavity extending to an outlet for the cable, a portion of the cable being mounted within the cavity and interconnected to another portion of the cable extending out of the cavity through the outlet and interconnected to the portion of cable in the guide, the portions attached together through a fold substantially in the plane of the cable such that the portion of the cable extending through the outlet is transverse to a portion of the cable in the cavity, wherein the outlet portion of cable is folded in a loop back over the fold in order to provide some slack in the cable proximate the fold. The latter arrangement enables the cable portion at the outlet to adjust for tolerances in the positioning of the cable within the housing. In particular, the cable can be securely positioned and fixed at the connector outlet, such secure fixing requiring the cable to adjust angularly within the plane of the cable, but also to adjust for positioning along the length of the cable. The loose folded over loop ensures that the cable at the outlet has some degree of freedom for adjustment in the position of the cable outlet without transmitting any significant forces to the fold. The latter is important in order to prevent forces acting on the folded part of the cable to cause damage to the conductors which could lead to rupture thereof.

Other advantageous aspects of the invention are described in the claims, or will be apparent from the following description and drawings.

BRIEF DESCRIPTION OF THE DRAWINGS

FIG. 5 is a view similar to that of FIG. 4 but with the cable looped over the fold and secured to an outlet portion of the cable guide.

DETAILED DESCRIPTION OF THE PREFERRED EMBODIMENT

Figure 1:
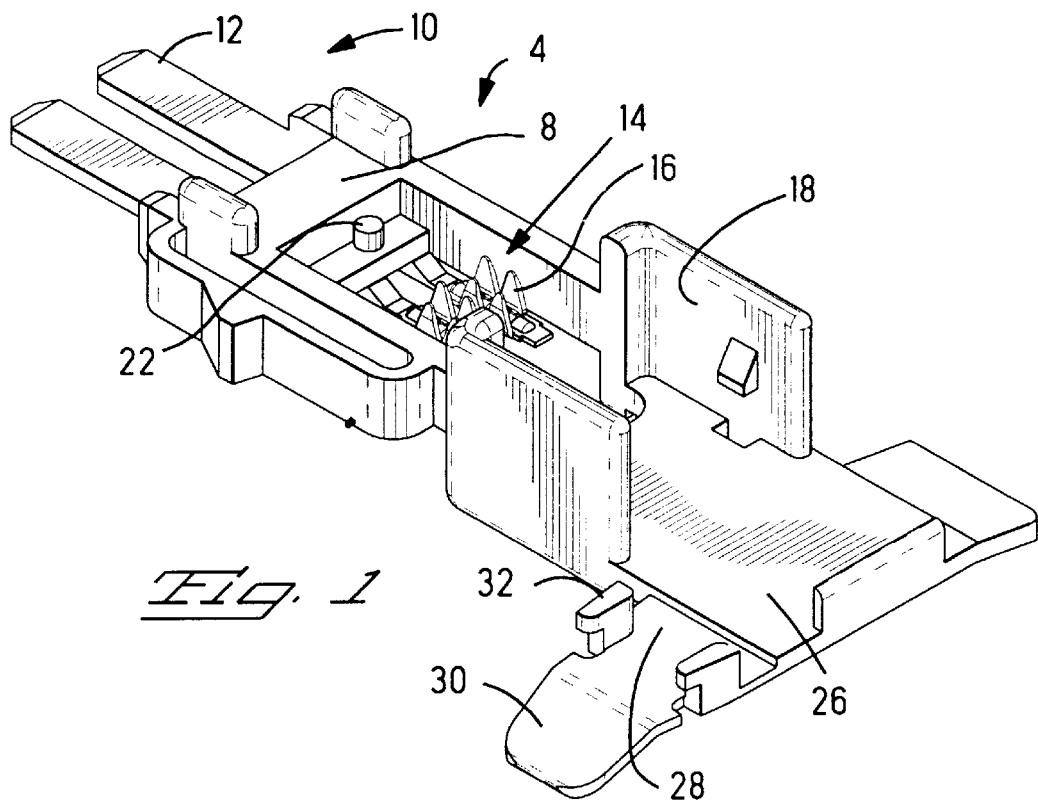
FIG. 1 is an isometric view of a connector.
Figure 2:
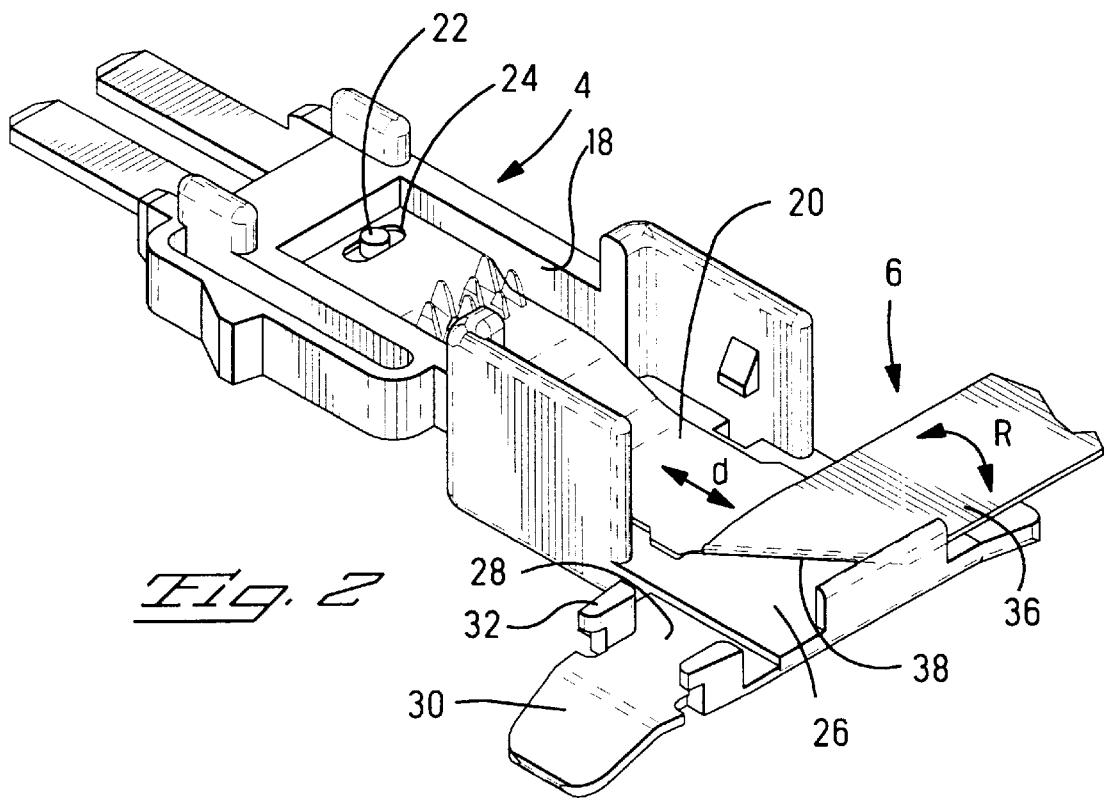
FIG. 2 is an isometric view of a connector terminated to a flat cable, the flat cable being folded to create a change in direction of the cable.

Referring first to FIG. 2, a cable assembly 2 comprises an electrical connector 4 and a flat cable 6. Referring to FIG. 1, the connector 4 comprises an insulative housing 8 and electrical terminals 10 mounted therein. The terminals 10 have a contact section 12 for plugging contact to a complementary terminal and a connection section 14 for electrically contacting conducting wires (not shown) that extend in a juxtaposed manner in the plane of the cable 6. In this embodiment, the connection section 14 comprises insulation piercing tabs 16 that pierce through the insulation of the cable 6 for contacting the conductive cores of the juxtaposed wire conductors extending within the cable.

The connector housing comprises a cavity 18 for receiving an end portion 20 of the cable 6 (see FIG. 2) therein. The connector portion 20 of the cable 6 is terminated to the terminal connection portions 14 as shown in FIG. 2. A stud 22 extends transversely to the plane of the cable 20 and is engageable in a hole 24 of the cable for secure retention thereof. The cavity 18 extends to an outlet region 26 proximate an outlet 28 for the cable 6.

The outlet 28 comprises a base wall 30 and retention protrusion 32 that engage in cut-outs 34 (see FIG. 3) of a portion 36 of the cable that extends through the outlet 28. The outlet 28 extends transversely, in this embodiment perpendicularly, to the direction D of the cable portion 20 mounted within the cavity 18. The particular embodiment relates to a connector used for connection to an automotive airbag, and in view of the tight space constraints, it is necessary to plug the connector 4 in the direction orthogonal to the general direction of the cable 6 extending out of the connector 4. It is also desired in this application to keep the connector as small and flat as possible and therefore the change in the direction of the cable must be very compact.

The cable 6 is assembled to the connector 4 by positioning the connector portion 20 as shown in FIG. 2, within the cavity 18 and depressing the cable onto the insulation piercing contacts 16 in a single operation. The cable is thus electrically connected to the connector. In the outlet region 26 the cable is folded upon itself to form a fold 38 that is substantially in the plane of the cable and extending obliquely to the direction D. The outlet portion 36 of the cable is then looped over the fold 38 by approximately 180° to form a flexible loop 40 in the cable outlet region 26 of the connector cavity 18. The cable outlet portion 36 is then positioned with respect to the retention members or protrusions 32 of the outlet, by virtue of the corresponding cut-outs 34 in the cable in order to secure the cable to the connector with respect to forces pulling on the cable outside of the connector. The flexible loop 40 enables the positioning of the retention features 32,34 to have a certain tolerance relative to the position of the fold 38 without causing undue pulling or bending forces on the fold 38.

Figure 3:
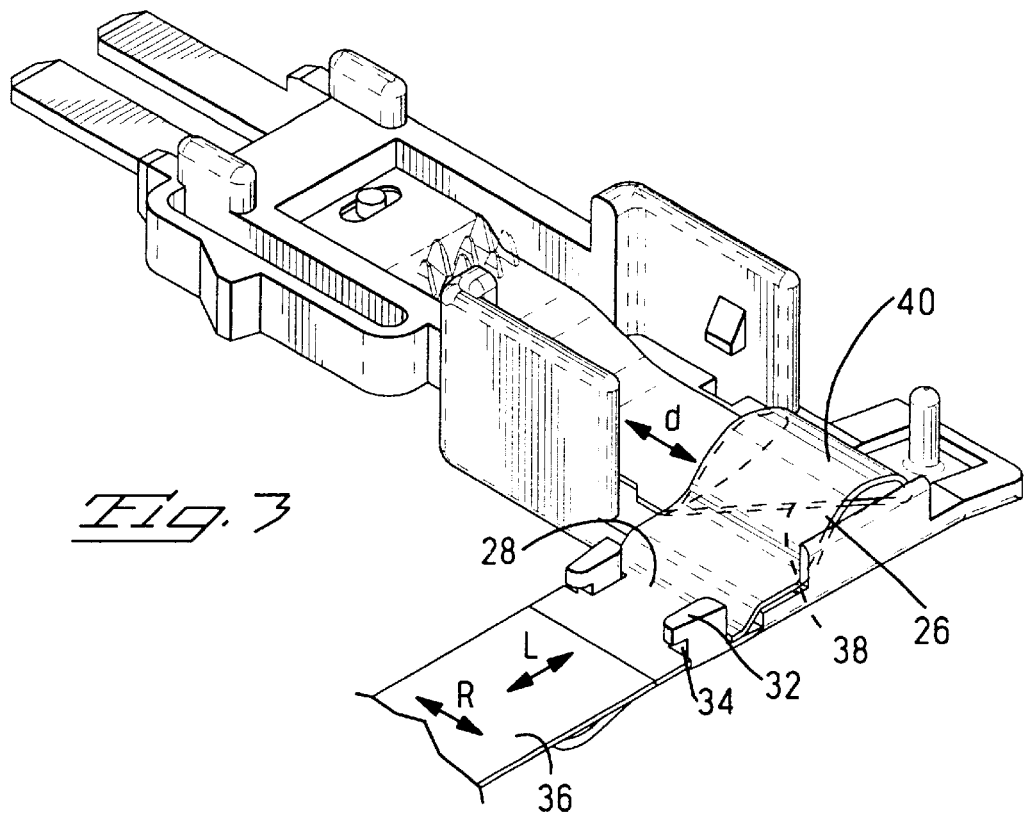
FIG. 3 is a view similar to that of FIG. 2, but with the outlet portion of the cable looped over the fold, the cable extending through the connector outlet.

As the flat flexible cable is quite rigid, with respect to displacement in its plane, if it were only folded as shown in FIG. 2, rotation of the cable in its plane as depicted by the arrow R would cause high forces on the conductors at the fold 38. Vibration, and thermal forces acting upon a cable having conductors which are already under stress, may lead to damage thereof. In view of the need for a very high reliability for safety functions such as airbags, any potential causes of damage to the cable must be eliminated. The provision of the loop 40 enables the cable as shown in FIG. 3 to have a certain degree of freedom of rotation in the direction R and movement along the length of the cable in the direction L, such movements being absorbed by the flexible nature of the loop 40, without the transmission of these forces to the fold 38.

Figure 4:
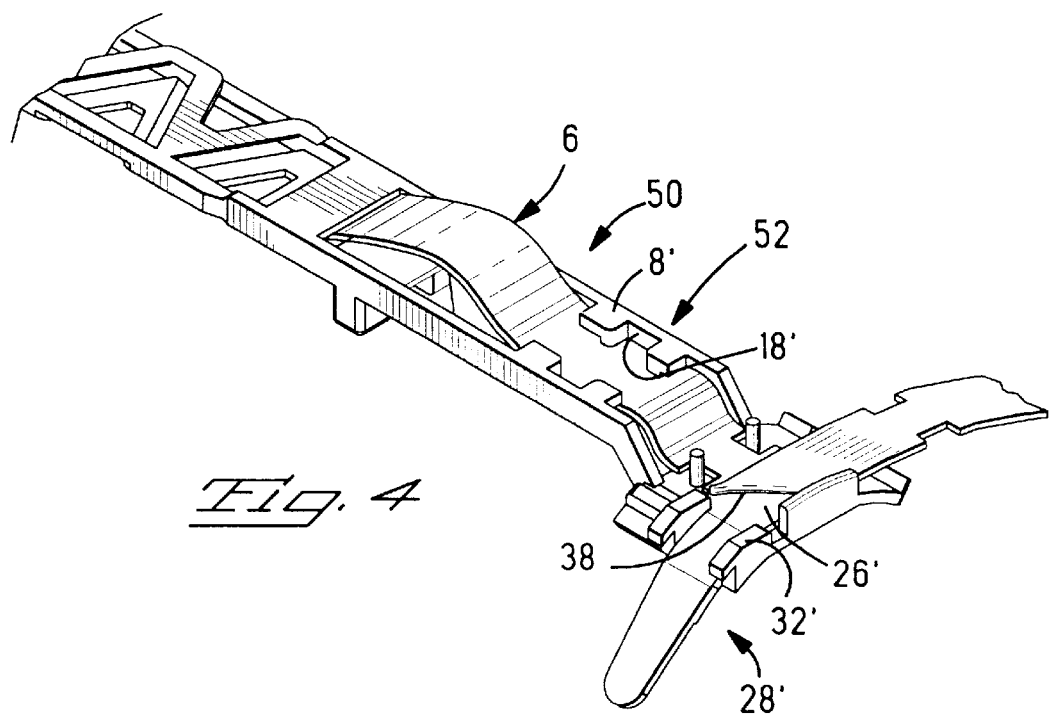
FIG. 4 is an isometric view of part of a cable guide having a cable therein, the cable folded to affect a change in direction.

The same principle is applicable also to cable support or guide assemblies, such as the cable guide assembly 50 shown in FIGS. 4 and 5. The assembly 50 comprises a cable guide 52 having a housing 8' with a cavity 18' within which a portion 20' of the cable 6 is guided and supported. The cable guide housing 8' comprises an outlet 28' that can be very similar in nature to the outlet 28 of the connector 4, having retention features 32' and a base wall 28' similar to the retention feature 32 in the outlet 28 of the connector. In the outlet region 26' of the cable guide 52, the cable is folded to provide a fold 38, and then looped over to provide a loop 40 in the same manner as already described for the connector and cable assembly of FIGS. 1–3. In both the connector 4 and cable guide 52, a cover member is then positioned over the cavity 18 and 18' of the connector and cable guide respectively in order to protect the portion of cable 20,20' and loop 40 within the connector and guide respectively.

Advantageously therefore, a reliable change in direction of a flat cable is provided, allowing absorption of tolerances in positioning, in a compact, cost effective and reliable manner.

We claim:

1. A cable assembly comprising a housing and a flat flexible cable having a plurality of conductors extending in a juxtaposed manner in the plane of the cable, the housing having a cavity for receiving a cavity portion of the cable therein, the housing further comprising an outlet through which an outlet portion of the cable extends in a direction transverse to the portion of cable within the cavity, the cable further comprising a fold substantially in the plane of the cable to effect a change in the direction of the flat cable substantially within its plane, the fold being positioned in an outlet region of the cavity proximate the outlet, characterized in that the outlet portion of cable transverse to the cavity portion of cable within the cavity is looped over the fold, to provide a flexible loop.

2. The assembly of claim 1 wherein the cable is looped through substantially 180° such that the cavity portion of cable is substantially parallel to the outlet portion of the cable, when considering the plane of the cable.

3. The assembly of claim 1 wherein the cable outlet is provided with means for gripping the cable in order to secure the flexible loop.

4. The assembly of claim 3 wherein the means for gripping the cable are provided with retention protrusions that engage in cut-outs in the outlet portion of the cable.

5. The assembly of claim 1 wherein the outlet portion of the cable extends at substantially 90° to the cavity portion of the cable.

6. The assembly of claim 1 wherein the housing is a housing of a connector, the connector having terminals with insulation piercing contacts that electrically contact the conductors of the cable cavity portion.

* * * * *